United States Patent
Heppe et al.

(10) Patent No.: US 6,477,359 B2
(45) Date of Patent: Nov. 5, 2002

(54) DIVERSITY RECEPTION FOR AERONAUTICAL PACKET DATA COMMUNICATIONS SYSTEMS

(76) Inventors: Stephen B. Heppe, 19022 Guinea Bridge Rd., Purcellville, VA (US) 20132; K. Prasad Nair, 6317 Poe Rd., Bethesda, MD (US) 20817; Steven Friedman, 903 Holburn St., Silver Spring, MD (US) 20902

( * ) Notice: Subject to any disclaimer, the term of this patent is extended or adjusted under 35 U.S.C. 154(b) by 0 days.

(21) Appl. No.: 09/848,619

(22) Filed: May 4, 2001

(65) Prior Publication Data

US 2002/0003790 A1 Jan. 10, 2002

Related U.S. Application Data

(60) Provisional application No. 60/202,116, filed on May 5, 2000.

(51) Int. Cl.$^7$ ............................................. H04B 17/02

(52) U.S. Cl. .................... 455/135; 455/132; 455/133; 455/140; 455/277.2; 370/312; 370/270; 375/347

(58) Field of Search ...................... 370/389, 390–393, 370/427, 328, 332, 334, 312; 455/101, 133–135, 277.1; 375/347

(56) References Cited

U.S. PATENT DOCUMENTS

| | | | | |
|---|---|---|---|---|
| 5,303,240 A | * | 4/1994 | Borras et al. ................ | 370/347 |
| 5,414,432 A | | 5/1995 | Penny, Jr. et al. .......... | 342/357 |
| 5,499,397 A | * | 3/1996 | Wadin et al. ............. | 455/277.1 |
| 5,530,926 A | * | 6/1996 | Rozanski .................. | 455/277.2 |
| 5,577,031 A | * | 11/1996 | Smith .......................... | 370/329 |
| 5,621,770 A | * | 4/1997 | Zastera ........................ | 375/347 |
| 6,018,651 A | * | 1/2000 | Bruckert et al. .......... | 455/277.1 |

OTHER PUBLICATIONS

P. Papazian, P. Wilson, M. Cotton, and Y. Lo, "Advanced Antenna Test Bed Characterization For Wideband Wireless Communication Systems", IEEE 4/99, pp. 1048–1052.*

H. Lin, c. Yang, and J Sun, "Path Diversity for Non–geostationary Orbit Satellite Communication Systems Using the Constellation of GPS", IEEE 4/99, pp. 3039–3042.*

E. Haas, "Aeronautical Channel Modeling", IEEE Mar. 2002, pp. 254–264.*

G. M. Stamatelos, and G. A. Kalivas, "Space–Diversity Issue in the Context of a B–ISDN–Oriented Indoor Radio Environment", IEEE Apr. 1996, pp. 461–468.*

R. Kronberger et al, "Multiband planer inverted–F car antenna for mobile phone and GPS," Antennas and Propagation Society, 1999. IEEE International Symposium 1999, vol. 4, pp. 2714–2727, Jul. 11–16, 1999.

M. Sanad et al, "A compact dual–band microstrip antenna for portable GPS/cellular phones," Antennas and Propagatin Society, 1999. IEEE International Symposium 1999, vol. 1, pp. 116–119, Jul. 11–16, 1999.

(List continued on next page.)

*Primary Examiner*—Hassan Kizou
*Assistant Examiner*—Thai Hoang
(74) *Attorney, Agent, or Firm*—Blank Rome Comisky & McCauley LLP

(57) ABSTRACT

This invention is an application of antenna diversity and two or more multi-channel radios, with a novel cooperative sharing strategy among the multi-channel radios, to aeronautical packet data communications and other communications. It offers the following benefits: enhanced data communications performance in a fading environment; enhanced data communications performance at long range; enhanced data communications performance in the presence of cochannel interference; extendable to an arbitrary number of cooperating peer radios; no single point of failure; no increase in pilot workload or change in operational procedures.

16 Claims, 1 Drawing Sheet

OTHER PUBLICATIONS

Federal Standard 1037C, "Telecommunications: Glossary of Telecommunication Terms," published by General Services Administration Information Technology Service, Aug. 7, 1996, p. C–23.

U.S. Coast Guard, "DGPS Configuration for all sites," printed Mar. 21, 2002, actual publication date unknown, http://www.navcen/uscg.gov/dgps/DgpsCompleteConfiguration.htm.

Province of British Columbia, "CDGPS Real–time positioning for Canada: Service Decsription," last updated Nov. 21, 2001, http://www.cdgps.com/e/service.htm.

* cited by examiner

DIVERSITY RECEPTION FOR AERONAUTICAL PACKET DATA COMMUNICATIONS SYSTEMS

REFERENCE TO RELATED APPLICATION

The present application claims the benefit of U.S. Provisional Application No. 60/202,116, filed May 5, 2000, whose disclosure is hereby incorporated by reference in its entirety into the present application.

FIELD OF THE INVENTION

The present invention is directed to the enhancement of air/air packet data communications reliability among aircraft, and the enhancement of air/ground packet data communications reliability between aircraft and ground systems.

BACKGROUND OF THE INVENTION

Aircraft commonly transmit and receive analog voice radio communications, to enable air traffic control and provide for other air traffic services (ATS), via radio equipment operating on selected frequency channels. A single aircraft typically supports at least one radio, and may support several radios, each radio tuned to a different frequency channel. Analog voice communications in the VHF band use frequency channels separated by 25 kHz between channel centers, and also 8.33 kHz between channel centers. The aviation industry is currently developing a digital voice and data capability for ATS which will also operate on 25 kHz channels in the VHF band.

Commercial aircraft may additionally support analog and digital air/ground communications for airline operational control (AOC). One example used in the VHF band is the Aircraft Communications Addressing and Reporting System (ACARS). The ACARS air/ground environment is described in ARINC Specification 618. The capabilities of onboard equipment are defined in ARINC Characteristics 597, 724 and 724B. Other standards may also apply. The aviation industry is also currently developing enhanced systems for AOC communications which will provide higher data rates and improved networking protocols than those which are available via ACARS.

A large commercial aircraft typically provides three VHF antennas for ATS and AOC communications—typically two of these are dedicated to ATS voice and the third is dedicated to AOC. A partial shift to digital voice is planned for the future in some regions.

The International Civil Aviation Organization (ICAO) has recently recommended for adoption a new radio communications system and protocol known as VHF Data Link Mode 4 (VDL/4). This radio communications system employs a minimum of two frequency channels and can optionally support additional channels.

A single VDL/4 line replaceable unit (LRU) comprises a chassis and associated VDL/4 electronics which support a minimum of two frequency channels and can optionally support additional channels. When a VDL/4 LRU is connected to a single antenna it can typically receive on multiple frequencies at once or transmit on any single frequency. A VDL/4 LRU connected to a single antenna is typically incapable of receiving on any channel during periods when it is transmitting on any single channel, although future advances in technology could enable simultaneous transmission on frequency $f_1$ and reception on frequency $f_2$ if the frequency separation $\Delta f = f_1 - f_2$ is sufficiently great. A VDL/4 LRU connected to two or more antennas (for example top-mounted and bottom-mounted) may be capable of simultaneous transmission on frequency $f_1$ via one antenna and reception on frequency $f_2$ via another antenna using current technology.

In transport category aircraft, overall operational reliability is typically enhanced by use of dual-redundant and sometimes triple-redundant systems. When applied to packet data communications e.g. VDL/4, operational reliability may be enhanced with a dual installation comprising two VDL/4 LRUs and two antennas, each VDL/4 LRU connected to a single antenna. In this type of installation the two VDL/4 LRUs are typically denoted as a "left" and "right" LRU. Failure of the "left" LRU can be compensated by the continued operation of the "right" LRU. Individual receiver and transmitter units, contained within the two VDL/4 LRUs, can also be dynamically re-assigned to different channels by a human operator or automatic control system capable of commanding the two VDL/4 LRUs (in some cases switching the receive or transmit function for a given frequency channel from one LRU to another LRU) in order to minimize the total number of receiver units and transmitter units needed to achieve a desired level of operational flexibility and reliability. This type of redundant installation is described in working paper 49 of ICAO/AMCP/7 (Montreal, Mar. 22–30, 2000). Since each VDL/4 LRU is connected to a single antenna in this type of installation, each VDL/4 LRU may be incapable of receiving on any frequency while it is transmitting on any single frequency. If two antennas were provided to each VDL/4 LRU, each VDL/4 LRU would have the potential to receive on frequency $f_1$ while transmitting on frequency $f_2$, but this configuration requires two antennas for each of two VDL/4 LRUs, for a total of four antennas. If two antennas were shared so that each antenna is connected to both VDL/4 LRUs simultaneously, the number of antennas can be limited to two but in this case the signal strength available to each VDL/4 LRU is reduced.

A concern of aeronautical radio communications systems, as for all radio communications systems, is the need to minimize the effects of environmental noise, cosite noise, radio-frequency propagation anomalies and antenna gain effects which can adversely affect communications reliability. In the aeronautical VHF bands, these factors are typically much more significant that receiver-generated noise.

FIG. 1 illustrates a dual-redundant configuration of antennas and radio LRUs known to the prior art. In this configuration a first antenna 11 and first radio LRU 12, and a second antenna 13 and second radio LRU 14, operate in parallel and support human (e.g., pilot and copilot) and other avionics systems 15 operational needs. Two antennas and two radio LRUs exist in this configuration, but the radio LRUs do not cooperate at a peer level. Instead they operate in accordance with commands issued by human operators or other avionics systems. For packet data transmission, only one radio LRU may be used at a time on any single frequency since transmission by two radio LRUs at the same time on the same frequency would result in garbled transmissions (even if the data transmitted by the two radio LRUs is the same). For packet data reception, again one radio LRU may be used with the other reserved as a spare (even if it is active); alternatively both may deliver received data to other onboard systems. In the latter case where both radio LRUs deliver data to other onboard systems, care must be exercised to ensure that the delivery of multiple copies of identical data does not adversely affect onboard operations.

In some cases involving packet data communications, a data link layer technical acknowledgement is required to be sent when a data packet is received. In order to prevent the simultaneous transmission of this technical acknowledgement by radio LRU 12 and radio LRU 14, which could lead to garbled transmissions, the acknowledgement means may be contained within the aggregate of other onboard systems 15 and may be connected to only one of the radio LRUs 12 or 14 at any one time. However, this may create a single point of failure unless redundant acknowledgement means are provided within the aggregate of other onboard systems 15, with appropriate switching mechanisms between the multiple radio LRUs and multiple acknowledgement means.

For some radio systems, e.g. VDL/4, accurate position and time information is used as part of the nominal channel management scheme, and may be provided by a GNSS antenna 16 and GNSS user receiver device 17 or alternative navigation means and an accurate clock. The position and time information may be passed to the radio LRUs and other onboard systems, as required, via direct interwiring from source systems or via other intermediate systems.

SUMMARY OF THE INVENTION

This invention is an application of antenna diversity and two or more multi-channel radio LRUs, with a novel cooperative sharing strategy among the multi-channel radio LRUs, to aeronautical packet data communications. Existing avionics and systems are not designed to accommodate antenna diversity, which is considered to increase the overall level of complexity thereby impairing operational reliability and potentially adding to cockpit workload. The present invention overcomes these concerns and offers the following benefits:

a) Enhanced data communications performance in a fading environment;

b) Enhanced data communications performance at long range;

c) Enhanced data communications performance in the presence of cochannel interference;

d) Extendable to an arbitrary number of cooperating peer radio LRUs;

e) No single point of failure;

f) Improved on-aircraft testing of radio functionality;

g) No increase in pilot workload or change in operational procedures.

DETAILED DESCRIPTION OF THE INVENTION

A preferred embodiment of the present invention will be set forth with reference to FIG. 2.

Figure 1:
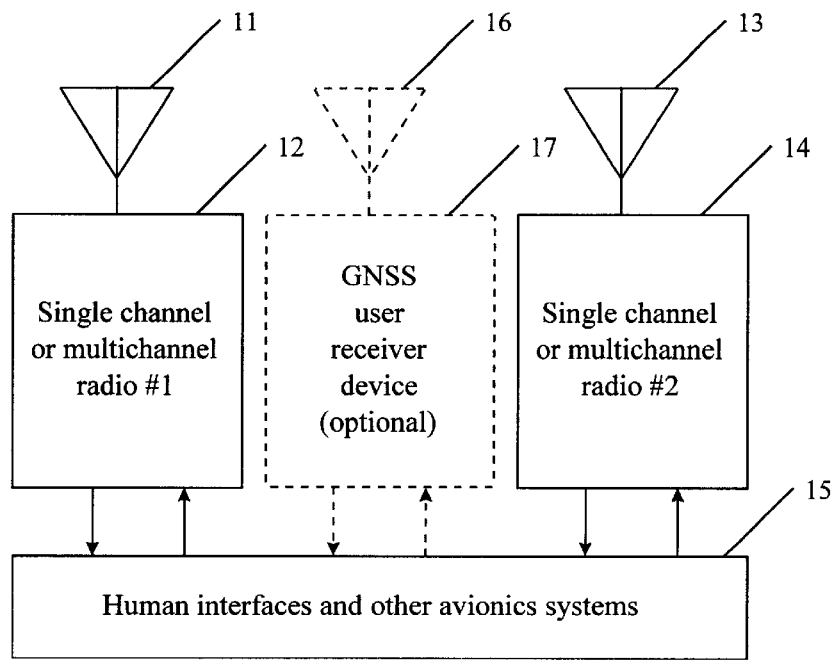
FIG. 1 illustrates a dual-redundant configuration of antennas and radio LRUs known to the prior art.
Figure 2:
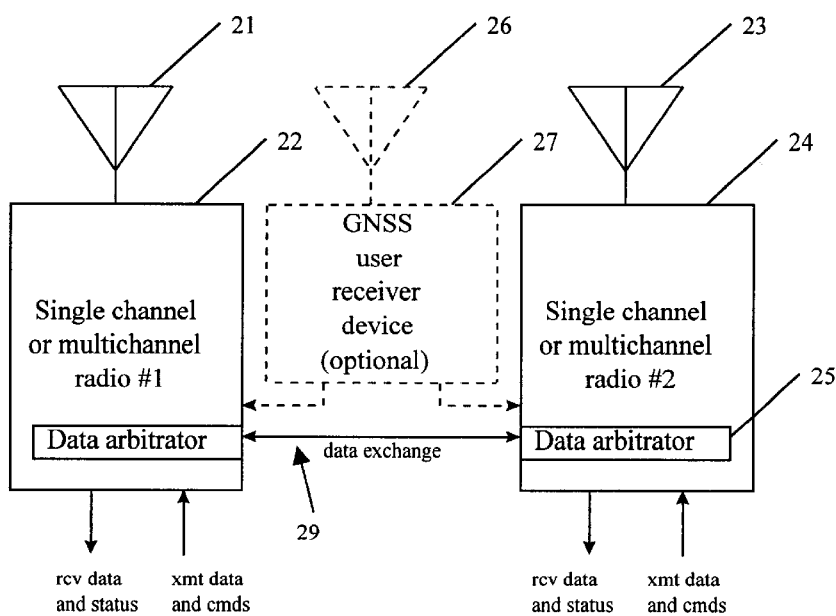
FIG. 2 illustrates an embodiment of the present invention comprising two multi-channel radio LRUs each connected to a separate antenna, wherein each radio LRU contains a data arbitrator designed to operate with one or more peer radio LRUs in a distributed architecture.

FIG. 2 illustrates a preferred embodiment of the present invention wherein a first antenna 21 and radio LRU 22, and a second antenna 23 and radio LRU 24, each contain a data arbitrator element 25. In this embodiment the two radio LRUs operate as cooperative peers and exchange data automatically to assist each other in achieving operational requirements. The radio LRUs may be single-channel or multi-channel, analog or digital or hybrid, and operate in any band, although for the purpose of the present invention they must be tuneable to the same frequencies and the benefits of at least one preferred embodiment of the present invention are only available on frequencies where packet data transmissions are supported.

Each radio LRU 22 and 24 receives configuration commands (e.g., tuning frequency, applications to be supported) and data for transmission from external systems, and delivers data it has received, and communicates its current status, to external systems. An interwiring means such as a wiring harness 29 connects the data arbitrators 25 of the various radio LRUs. The interwiring means may be direct or may alternatively pass through intermediate systems.

An optional GNSS antenna 26 and GNSS user receiver device 27 may be used as one of several alternative methods to provide time signals and position information to the radio LRUs (as well as other devices not shown).

In normal operation each radio LRU 22 and 24 may be tuned to a separate channel or group of channels in support of operational needs as determined by e.g. internal software configuration or external commands. Each radio LRU also requests "shadow reception service" for its data-oriented applications from its peer radio LRUs, via the associated data arbitrators 25. If one or more of the peer radio LRUs have unassigned resources available (i.e., ability to tune to and receive RF signals on requested channels in addition to the channels supporting operational need as determined by e.g. internal software configuration or external commands), the one or more of the said peer radio LRUs configure their unassigned resources as required to provide the requested shadow reception service. The peer radio LRUs communicate their requests and current configuration via the interwiring means between radio LRUs, said interwiring means carrying inter alia radio coordination and configuration data as well as received signals or user message data received via the radio channels for which shadow reception service was requested. The coordination protocols between radio LRUs are ideally configured to allow requests for shadow reception service to be specified according to a priority scheme. Thus, if a peer radio LRU has limited resources which can accommodate some but not all of the requests for shadow reception service from its peer radio LRUs, it may assign its resources to the requests with the highest priorities.

In one preferred embodiment of the present invention, the data arbitrators 25 operate above the Media Access Control (MAC) sublayer of the data protocol supported by the radio LRUs, so for data reception a data arbitrator will handle a packet after it has been checked to ensure error-free reception, but e.g. before generation of a technical acknowledgement. When a data message is successfully received without error by e.g. radio LRU 24, it is passed to the associated data arbitrator 25 which is a software process internal to the radio LRU. The data arbitrator 25 maintains a data base of appropriate identifying data for all received radio messages associated with frequencies for which it and its associated radio LRU have primary responsibility, which said messages it has received from any source. The nature of the appropriate identifying data for a message can vary from system to system, but should be sufficient to uniquely identify a message received on any frequency, by any radio LRU, within a short span of time on the order of several seconds. Possible examples of such appropriate identifying data include but are not limited to a hash of the message, such as a CRC check, and the message arrival time and ID of the sending aircraft. When a data arbitrator receives a message from its associated radio LRU or the interwiring means, said message having been received on a frequency for which the data arbitrator and radio LRU has primary responsibility as determined e.g. by its internal software configuration or external command, the data arbitrator must determine if it has already received and processed the data message from another source. It does this by comparing the appropriate identifying data, for the data message received, with the stored identifying data for messages it has already processed and passed to external systems according to its primary responsibility as determined e.g. by its internal software configuration or external command. If the data arbitrator determines that the data message has not already been processed and passed to external systems, the data message is processed and passed to appropriate external systems and the appropriate identifying data is stored. Otherwise, the data message is cleared without further processing. Periodically or a periodically, the stored data may be cleared or overwritten. If the data arbitrator receives a data message from its associated radio LRU, said data message received on a frequency for which the radio LRU has accepted shadow reception responsibility, it is passed to the data arbitrator of the appropriate peer radio LRU which requested the shadow reception service via the interwiring means. This embodiment is preferred since the data arbitrators operate above the MAC sublayer, minimizing data rate and bandwidth requirements on the interwiring means between data. Selected metadata, such as signal arrival time and signal strength associated with received messages, may also be passed over the interwiring means.

In a second embodiment of the present invention, the data arbitrators operate below the MAC sublayer and pass either soft-decision metrics from a demodulator, radio-frequency signals downconverted to an intermediate frequency, or radio-frequency signals themselves. This embodiment allows soft-decision combining or antenna beamforming synthesis, which can enhance receive performance, but requires wider bandwidth interwiring means. In this embodiment the data arbitrator is not required to store data relating to messages it has already processed according to its primary responsibility, since the intent of this embodiment is to generate a single estimate of the transmitted message based on the multiple received signals.

For data transmission, a data packet may be formatted for transmission and bypass the data arbitrator 25 within a radio LRU. In the fault-free case there is no need for the data arbitrator to handle data prepared for transmission since the radio LRU with primary responsibility can make the transmission and only a single transmission on any given frequency is desired.

In one embodiment of the present invention the data arbitrators have no ability to re-route data prepared for transmission from one radio LRU A to another radio LRU B.

In another embodiment of the present invention the data arbitrator associated with a radio LRU A may be configured to route a packet prepared for transmission to another compatible data arbitrator for a peer radio LRU B that is able to transmit the data which has been prepared for transmission by radio LRU A, in order to use the transmitter in radio LRU B and compensate for a failed transmitter in radio LRU A.

Radio LRUs may be configured to receive simultaneously on multiple frequencies using multiple protocols, but transmit on only one frequency (perhaps using only one protocol). For example, a two-way voice radio may also provide shadow reception service according to certain data protocols without any ability to transmit according to said data protocols. In this way a voice radio A can provide an enhancement of overall data reception performance for separate data radio B, at marginal increase in cost.

Multiple radio LRUs may be simultaneously configured with primary responsibility for a given frequency $f_1$, and these radio LRUs may request shadow reception service for frequency $f_1$ from each other as well as other peer radio LRUs. In this case the individual radio LRUs with primary responsibility may each individually rely on a single receiver module for the primary and shadow responsibility, consuming no additional resources but passing received data to the requesting peer radio LRU(s) via the interwiring means. Each radio LRU with primary responsibility, which has requested shadow reception service, separately arbitrates the available data and can deliver received messages to external systems independent of its peers. In this way the present invention can mimic the operational architecture of existing systems, while still providing enhanced receive performance.

In one embodiment of the present invention, two peer radio LRUs A and B are employed with each connected to a dedicated antenna; radio LRU A takes primary responsibility for all applications and radio LRU B serves as a redundant backup also providing shadow reception service to all applications supported by radio LRU A. Therefore all transmission events are handled by radio LRU A and radio LRU B provides a simultaneous receive capability during periods of transmission by radio LRU A, as well as a second receive capability when radio LRU A is not transmitting.

The present invention may be extended in an obvious way to multiple antennas and radio LRUs (greater than 2). For example, on a typical commercial aircraft there may be three VHF antennas available. Each can be connected to a different multichannel radio LRU A, B and C and those three multichannel radio LRUs A, B and C may be interwired in an extension of the concept described herein. In operation, radio LRU A and B may be operationally associated with ATS voice communications and radio LRU C may be operationally associated with AOC voice and data communications, automatic dependent surveillance broadcast (ADS-B) transmission and reception, weather uplink reception and other data applications. Radio LRUs A and B would not make any requests for shadow reception since they are operationally associated with voice communications. Radio LRU C however would request shadow reception services from radio LRUs A and B for its numerous data-oriented channels. If radio LRUs A and B had resources available, they would tune those resources to the requested channels and deliver any data messages received on those channels to radio LRU C. Radio LRU C would then have the benefit of three diversity antennas for its data-oriented applications.

The likelihood of successful data reception by a single antenna/radio LRU pair is determined in part by the strength of the signal in space, the gain of the receiving antenna, and the noise experienced by the radio LRU's demodulation means. The present invention is beneficial because antenna gain patterns are not exactly uniform in azimuth and elevation, and noise and interference events are not perfectly identical on all antennas simultaneously. Consider an incoming radio signal arriving on frequency f from azimuth $\phi$ and elevation $\theta$ with field strength S, and no onboard transmission. Considering the gain patterns of the k antennas connected to the k radios tuned to frequency f, and the noise statistics $N_{o,k}$ experienced by the k radio LRUs, the probability of successful message reception for a given radio LRU k may be denoted $P_k(f, \phi, \theta, S, N_{o,k}) \leq 0$. Assuming that the statistics of successful message reception across the k radio LRUs are uncorrelated, the probability that at least one of a set of radio LRUs {k} will receive a given message successfully is $$\Pr\{\text{success}\} = 1 - \prod_k (1 - p_k(f, \varphi, \theta, S, N_{o,k})),$$

which is greater than any of the $p_k$ if all $P_k$>0.

If two radio signals arrive at the same time on frequency $f_1$, the ability of a radio LRU A to discriminate between them, and successfully demodulate without error at least one of them, depends in part on the relative signal strength between the two said signals at the output of the antenna to which the radio LRU A is connected. If a second radio LRU B is tuned to frequency $f_1$, in order to provide a shadow reception service for radio LRU A, each of the two radio LRUs has a chance to successfully demodulate at least one of the messages (typically the stronger of the two). Furthermore, since each antenna provides a different gain pattern over azimuth and elevation, and the two radio signals are likely to arrive from different azimuths and elevations, each radio LRU A and B tuned to frequency $f_1$ according to the present invention will likely experience a different relative signal strength between the two radio signals. So even if radio LRU A experiences a poor relative signal strength, radio LRU B may experience a better relative signal strength that allows at least one of the radio signals to be successfully demodulated.

If a multichannel radio LRU A is required to transmit on frequency $f_1$, it may be unable to simultaneously receive on another frequency $f_2 \neq f_1$. However, a peer radio LRU B may be able to receive on frequency $f_2$ during a transmission by radio LRU A on frequency f, thereby allowing an effective capability for simultaneous transmission and reception on multiple frequencies.

A first embodiment of the present invention does not contemplate the delegation of transmission responsibility from one radio LRU A to a peer radio LRU B in normal fault-free operation. However, the delegation of transmit responsibility could be used as a means to provide fail-soft operation among a group of peer radio LRUs. For example, if a radio LRU A determines through diagnostic self-test or other means that its transmit capability is failed or degraded, it could potentially delegate transmit responsibility to a given other radio LRU B (possibly selecting a different peer radio LRU for different transmit events). This capability would not preclude the ability of a pilot or other operator (human or automatic) to reconfigure the primary responsibilities of the radio LRUs in accordance with normal failure procedures.

A second embodiment of the present invention contemplates the delegation of transmit responsibility from one radio LRU A to a peer radio LRU B in normal fault-free operation, subject to predefined criteria such as message priority, length, or possible refinements such as known azimuth and elevation to an intended recipient and consideration of known or estimated antenna gain patterns for the multiple antennas associated with the multiple radio LRUs.

The present invention provides a full over-the-air loop-back test capability. Under the control of appropriate diagnostic software, a radio LRU A can request shadow reception service from another radio LRU B for a frequency channel fk on which radio LRU A is authorized to transmit. Radio LRU A can then transmit a message to itself, which may be received by radio LRU B and delivered to radio LRU A via the associated data arbitrators and interwiring.

The benefits of the present invention are foreseen primarily with the application of multi-channel radio LRUs. However, the use of single-channel radio LRUs provides a residual benefit.

Variations on the invention will be apparent to those skilled in the art. For example, protocols other than those specifically set forth above can be implemented. Therefore, the present invention should be construed as limited only by the appended claims.

We claim:

1. A system for packet data communications for data-oriented applications, the system comprising:

a plurality of radios, each of the plurality of radios supporting at least one packet-oriented data protocol common to all of the plurality of radios, and each of the plurality of radios comprising a receiver;

a plurality of antennas in one-to-one communication with the plurality of radios for the packet data communications; and interwiring means for interconnecting the plurality of radios, wherein:

each of the plurality of radios further comprises a data arbitrator, in communication with the data arbitrators of the others of the plurality of radios through the interwiring means, for requesting shadow reception service for said data-oriented applications from the other radios, controlling the radio associated with that data arbitrator to provide the shadow reception service in response to requests received from the other radios if the radio can provide the shadow reception service with the resources available, and arbitrating among possible multiple copies of a received packet data message associated with one of the data-oriented applications, said possible multiple copies received by the radio's receiver or by the interwiring means from the other radios, so that only a first copy of said possible multiple copies is further processed and subsequent copies of said possible multiple copies are not further processed.

2. The system of claim 1, wherein the plurality of radios implement a common priority scheme for the requests for shadow reception service, thereby allowing each of the radios to determine a most preferred set of shadow reception service requests.

3. The system of claim 1, wherein each of the radios further comprises a transmitter, and wherein the data arbitrators delegate transmit responsibility among the plurality of radios.

4. The system of claim 1, wherein, when a first one of the radios transmits a self-addressed message, and when a second one of the radios receives the self-addressed message, the second one of the radios transmits the self-addressed message over the interwiring means to the first one of the radios, providing shadow reception service to enable over-the-air loop-back testing.

5. The system of claim 1, wherein each of the plurality of radios comprises a radio LRU for aeronautical packet data communications.

6. The system of claim 5, wherein the plurality of radio LRUs implement a common priority scheme for the requests for shadow reception service, thereby allowing each of the radio LRUs to determine a most preferred set of shadow reception service requests.

7. The system of claim 5, wherein each of the radio LRUs further comprises a transmitter, and wherein the data arbitrators delegate transmit responsibility among the plurality of radio LRUs.

8. The system of claim 5, wherein, when a first one of the radio LRUs transmits a self-addressed message, and when a second one of the radio LRUs receives the self-addressed message, the second one of the radio LRUs transmits the self-addressed message over the interwiring means to the first one of the radio LRUs, providing shadow reception service to enable over-the-air loop-back testing.

9. The system of claim 1, wherein each of the plurality of radios comprises a radio LRU for packet data communications as well as other communications.

10. The system of claim 9, wherein the plurality of radio LRUs implement a common priority scheme for the requests for shadow reception service, thereby allowing each of the radio LRUs to determine a most preferred set of shadow reception service requests.

11. The system of claim 9, wherein each of the radio LRUs further comprises a transmitter, and wherein the data arbitrators delegate transmit responsibility among the plurality of radio LRUs.

12. The system of claim 9, wherein, when a first one of the radio LRUs transmits a self-addressed message, and when a second one of the radio LRUs receives the self-addressed message, the second one of the radio LRUs transmits the self-addressed message over the interwiring means to the first one of the radio LRUs, providing shadow reception service to enable over-the-air loop-back testing.

13. A system for aeronautical communications, the system comprising:
   a plurality of radio LRUs;
   a plurality of antennas in one-to-one communication with the plurality of radio LRUs; and
   interwiring means for interconnecting the plurality of radio LRUs, wherein:
      the plurality of radio LRUs are individually configured to request shadow reception service from other ones of the radio LRUs and to provide the shadow reception service in response to requests received from the other ones of the radio LRUs if said shadow reception service can be provided with resources available, said shadow reception service comprising RF, downcoverted RF or a soft-decision demodulator output signal stream.

14. The system of claim 13, wherein the plurality of radio LRUs implement a common priority scheme for the requests for shadow reception service, thereby allowing each of the radio LRUs to determine a most preferred set of shadow reception service requests.

15. The system of claim 13, wherein each of the radio LRUs further comprises a transmitter, and wherein the data arbitrators delegate transmit responsibility among the plurality of radio LRUs.

16. The system of claim 13, wherein, when a first one of the radio LRUs transmits a self-addressed message, and when a second one of the radio LRUs receives the self-addressed message, the second one of the radio LRUs transmits the self-addressed message over the interwiring means to the first one of the radio LRUs, providing shadow reception service to enable over-the-air loop-back testing.

* * * * *